United States Patent
Beller et al.

(10) Patent No.: US 11,551,006 B2
(45) Date of Patent: Jan. 10, 2023

(54) REMOVAL OF PERSONALITY SIGNATURES

(71) Applicant: International Business Machines Corporation, Armonk, NY (US)

(72) Inventors: Charles E. Beller, Baltimore, MD (US); Christopher F. Ackermann, Fairfax, VA (US); Kristen Maria Summers, Takoma Park, MD (US); David McQuenney, Yorktown Heights, NY (US); Rob High, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 16/564,013

(22) Filed: Sep. 9, 2019

(65) Prior Publication Data

US 2021/0073334 A1 Mar. 11, 2021

(51) Int. Cl.
*G06F 40/30* (2020.01)
*G06F 21/62* (2013.01)
(Continued)

(52) U.S. Cl.
CPC .............. *G06F 40/30* (2020.01); *G06F 16/93* (2019.01); *G06F 21/6254* (2013.01);
(Continued)

(58) Field of Classification Search
CPC ...... G06F 40/30; G06F 16/93; G06F 21/6254; G06N 5/04
(Continued)

(56) References Cited

U.S. PATENT DOCUMENTS 6,418,410 B1 * 7/2002 Nassiff .................. G10L 15/183
704/235
6,591,300 B1 * 7/2003 Yurkovic ............... G06Q 10/10
709/224

(Continued)

OTHER PUBLICATIONS

Fernandes et al., "Author Obfuscation using Generalised Differential Privacy", Arxiv preprint:1805.08866, May 22, 2018.

(Continued)

*Primary Examiner* — Akwasi M Sarpong
(74) *Attorney, Agent, or Firm* — Lieberman & Brandsdorfer, LLC

(57) ABSTRACT

Embodiments relate to an intelligent computer platform to selectively amend one or more document elements. A first document is subjected to natural language processing (NLP) and two or more document characteristics are subjected to an assessment to produce a characteristic value. The document characteristics and corresponding characteristic values are analyzed to produce a characteristic profile for each identified document characteristic. Upon receipt of a new document, document characteristic data and corresponding characteristic value(s) are identified. The corresponding characteristic value(s) of the new document is applied against the produced characteristic profile. New document characteristic data is selectively amended responsive to the comparison, and a new document version is created from the selective amendment.

20 Claims, 10 Drawing Sheets

(51) Int. Cl.
*G06F 16/93* (2019.01)
*G06F 40/284* (2020.01)
*G06N 5/04* (2006.01)
*G06N 20/00* (2019.01)

(52) U.S. Cl.
CPC ............ *G06F 40/284* (2020.01); *G06N 5/04* (2013.01); *G06N 20/00* (2019.01)

(58) Field of Classification Search
USPC ............................................ 704/9, 200, 275
See application file for complete search history.

(56) References Cited

U.S. PATENT DOCUMENTS

| | | | |
|---|---|---|---|
| 7,580,551 B1* | 8/2009 | Srihari | G06V 40/33 |
| | | | 382/187 |
| 7,627,562 B2* | 12/2009 | Kacmarcik | G06F 40/253 |
| 8,428,934 B2* | 4/2013 | Connor | G06F 40/253 |
| | | | 434/167 |
| 8,666,961 B1* | 3/2014 | Qureshi | G06F 16/24 |
| | | | 707/769 |
| 9,141,689 B2 | 9/2015 | Chen | |
| 10,594,757 B1* | 3/2020 | Shevchenko | G06F 40/35 |
| 10,599,770 B1* | 3/2020 | Strope | G06F 40/289 |
| 10,902,221 B1* | 1/2021 | Zhang | G06N 3/04 |
| 2003/0233620 A1* | 12/2003 | Vedullapalli | G06F 40/103 |
| | | | 715/209 |
| 2004/0064335 A1* | 4/2004 | Yang | G06Q 30/0185 |
| | | | 726/25 |
| 2004/0162827 A1* | 8/2004 | Nakano | G06F 16/334 |
| 2005/0091543 A1* | 4/2005 | Holtzman | H04L 63/0407 |
| | | | 726/19 |
| 2007/0010992 A1* | 1/2007 | Hon | G06F 40/253 |
| | | | 704/9 |
| 2007/0288458 A1* | 12/2007 | Kacmarcik | G06F 40/253 |
| 2009/0070095 A1* | 3/2009 | Gao | G06F 40/45 |
| | | | 704/2 |
| 2010/0125502 A1* | 5/2010 | Solomon | G06Q 30/02 |
| | | | 705/14.52 |
| 2011/0029526 A1* | 2/2011 | Knight | G06F 16/287 |
| | | | 707/737 |
| 2011/0184727 A1* | 7/2011 | Connor | G06F 40/253 |
| | | | 704/E11.001 |
| 2012/0254333 A1* | 10/2012 | Chandramouli | G06F 40/10 |
| | | | 709/206 |
| 2013/0232159 A1* | 9/2013 | Daya | G06Q 30/0241 |
| | | | 709/204 |
| 2015/0046346 A1* | 2/2015 | Juola | G06F 21/31 |
| | | | 705/310 |
| 2017/0220535 A1* | 8/2017 | Olsen | G06F 40/117 |
| 2017/0249479 A1* | 8/2017 | Gordon | G06F 40/166 |
| 2017/0308807 A1* | 10/2017 | Hauth | G06F 16/24578 |
| 2018/0052911 A1* | 2/2018 | Allen | G06F 16/337 |
| 2018/0089155 A1 | 3/2018 | Baron et al. | |
| 2018/0211265 A1 | 7/2018 | Natarajan et al. | |
| 2018/0366114 A1* | 12/2018 | Anbazhagan | G06F 3/167 |
| 2019/0109863 A1* | 4/2019 | Traore | G06K 9/6217 |
| 2019/0238516 A1* | 8/2019 | Weggenmann | G06F 21/6254 |
| 2019/0377785 A1 | 12/2019 | N et al. | |
| 2019/0384686 A1* | 12/2019 | Estes | G06F 16/93 |
| 2021/0223351 A1* | 7/2021 | Yu | G01S 5/0218 |

OTHER PUBLICATIONS

A.W.E. Mcdonald et al., "Use Fewer Instances of the Letter "i": Toward Writing Style Anonymization", Pets 2012, p. 139-153.

Brennan, Michael, et al., "Adversarial Stylometry: Circumventing Authorship Recognition to Preserve Privacy and Anonymity", ACM Transactions on Information and System Security, vol. 15, No. 3, Article 12, Nov. 2012.

List of IBM Patents or Applications Treated as Related, Sep. 2019.

Bevendorff, J., et al., "Heuristic Authorship Obfuscation", Proceedings of the 57th Annual Meeting of the Association for Computational Lingsuitucs, Jul. 28, 2019.

Bo, Haohan, et al., "ER-AE: Differentially-Private Text Generation for Authorship Anonymization", arXiv: 1907.08736 (2019).

Potthast, M., et al., "Author Obfuscation: Attacking the State of the Art in Authorship Verification", CLEF (2016).

Weggenmann, B., et al., "Syntf: Sythetic and Differentially Private Term Frequency Vectors for Privacy-Preserving Text Mining", The 41st International ACM SIGIR Conference on Research & Development in Information Retrieval (2018).

U.S. Appl. No. 16/564,014, filed Jan. 21, 2022.

* cited by examiner

REMOVAL OF PERSONALITY SIGNATURES

The invention was made with government support under contract number 2018-18010800001. The government has certain rights to this invention.

BACKGROUND

The present embodiments relate to an artificial intelligence platform and machine learning for obscuring the identity of an author in an anonymous document. More specifically, the embodiments relate to identifying an author through a personality vector score and modifying the document to change the score and provide author anonymity.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

SUMMARY

The embodiments include a system, computer program product, and method for annotation assessment and adjudication for selectively amending document characteristic data.

In one aspect, a computer system is provided with a processing unit and memory for use with an artificial intelligence (AI) computer platform to amend one or more document characteristic values. The processing unit is operatively coupled to the memory and is in communication with the AI platform. As shown and described, the AI platform includes tools in the form of a natural language (NL) manager, a profile manager, a document manager, and a director. The NL manager subjects a first document set to natural language processing (NLP) and identifies two or more document characteristics within two or more documents of the first document set. The NL manager further subjects the identified two or more document characteristics to an assessment to produce a characteristic value for each document characteristic. The profile manager analyzes the identified document characteristics and corresponding characteristic values across the first document set to produce a characteristic profile for each identified document characteristic. The document manager detects receipt of a new document and analyzes the new document with respect to the identified two or more document characteristics and identifies document characteristic data and corresponding characteristic value. The director applies the corresponding characteristic value of the new document against the produced characteristic profile and compares one or more characteristic values to the produced characteristic profile. The director selectively amends the new document characteristic data responsive to comparison and creates a new document version from the selective amendment.

In another aspect, a computer program device is provided with a computer readable storage medium and embodied program code executable by a processor and configured to amend one or more document characteristic values. Program code subjects a first document set to natural language processing (NLP) and identifies two or more document characteristics within two or more documents of the first document set. The identified two or more document characteristics are subjected to an assessment to produce a characteristic value for each document characteristic. Program code analyzes the identified document characteristics and corresponding characteristic values across the first document set to produce a characteristic profile for each identified document characteristic. Upon receipt of a new document, program code analyzes the new document with respect to the identified two or more document characteristics and identifies document characteristic data and corresponding characteristic value. The corresponding characteristic value of the new document is applied against the produced characteristic profile and program code compares one or more characteristic values to the produced characteristic profile. The new document characteristic data is selectively amended responsive to comparison and a new document version is created from the selective amendment.

In yet another aspect, a method is provided for amending one or more document characteristic values. A first document set is subjected to natural language processing (NLP) and two or more document characteristics are identified within two or more documents of the first document set. The identified two or more document characteristics are subjected to an assessment to produce a characteristic value for each document characteristic. The identified document characteristics and corresponding characteristic values are analyzed across the first document set to produce a characteristic profile for each identified document characteristic. Upon receipt of a new document, the new document is analyzed with respect to the identified two or more document characteristics and document characteristic data and a corresponding characteristic value are identified. The corresponding characteristic value of the new document is applied against the produced characteristic profile and one or more characteristic values are compared to the produced characteristic profile. The new document characteristic data is selectively amended responsive to the comparison, and a new document version is created from the selective amendment.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is understood in the art that an author has innate authorship and writing characteristics. At times, authorship of a document may be identified from these innate characteristics. However, it is understood that for various reasons an author of a document may wish to remain anonymous. With respect to anonymity, the identity of the author may still be ascertained based on writing style characteristics, such as, but not limited to, use of function words, nouns, verbs, adjectives, and active and passive voices. Furthermore, an author's personality is reflected in their writing style. Tools have been developed that can extract an author's personality from a document and assign a personality vector score comprised of different personality characteristics e.g. openness, altruism, etc. An author's personality vector score often stays consistent over a series of writing samples creating a pattern that can be used to identify the author. Current techniques for anonymizing writing styles do not take into account an author's personality vector score or personality profile. Modifying a document to remove predictable personality patterns functions to disguise an author's identify and helps to maintain authorship anonymity.

Figure 1:
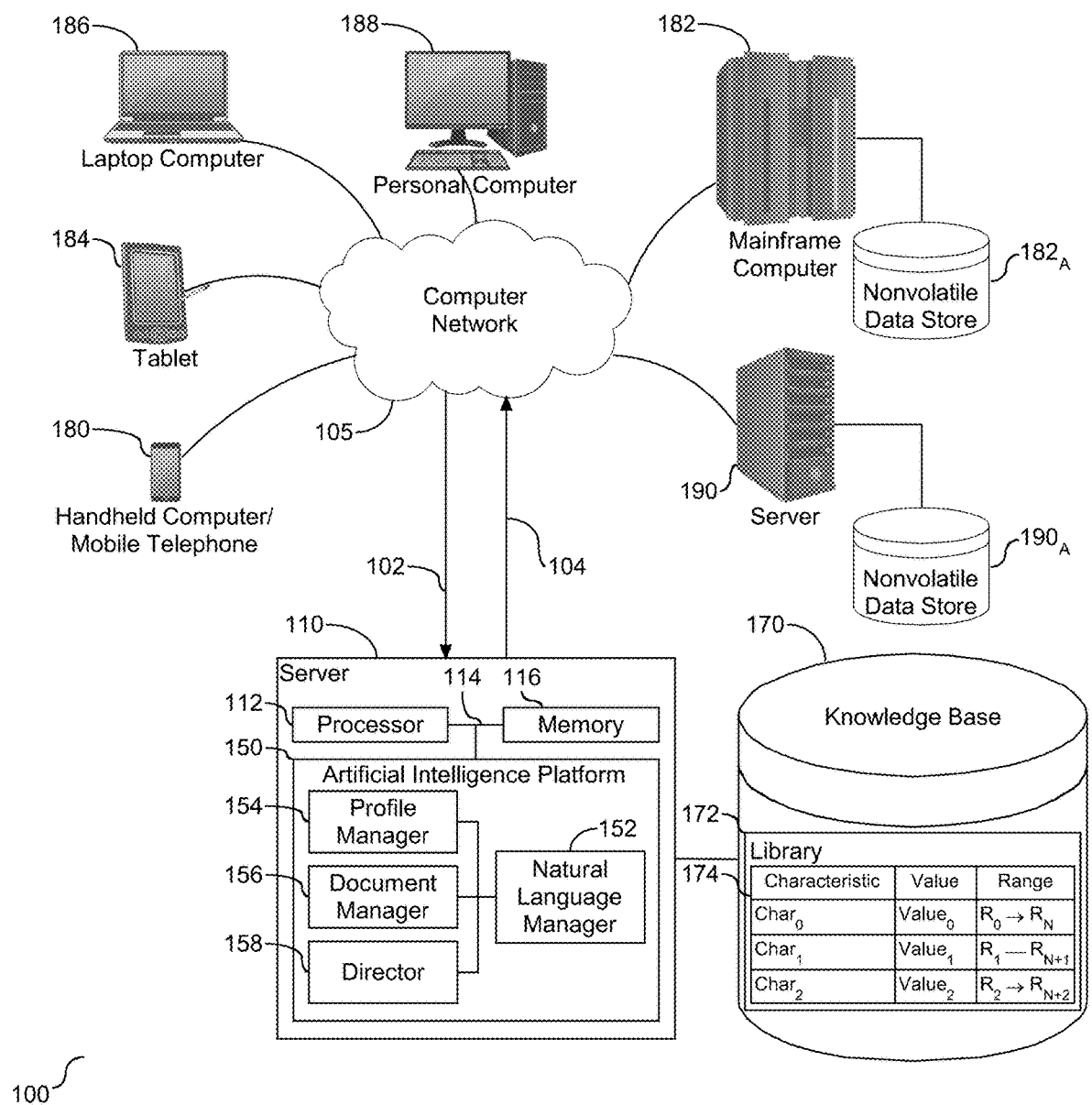
FIG. 1 depicts a system diagram illustrating an artificial intelligence platform computing system.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including NLP and ML, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to identify multi-lingual action tokens to support and enable multi-lingual action identification using machine learning techniques. The tools include, but are not limited to, a natural language (NL) manager (152), a profile manager (154), a document manager (156), and a director (158). The AI platform (150) may receive input across the network (105) and leverage a data source (170), also referred to herein as a corpus or knowledge base, to selectively access domain activity data. As shown the data source (170) is configured with a library (172). In one embodiment, the library may be distributed across the network (105). Accordingly, the AI platform (150) and the corresponding tools (152)-(158) are operatively coupled to the knowledge base (170) and the corresponding library (172).

It is understood that supervised learning leverages data from the knowledge base. As shown herein, the knowledge base (170), also referred to as a data source, is configured with domains and logically grouped activity data in the form of models, structure(s), and module(s). The NL manager (152) functions to subject a received document to NLP to identify a vector, e.g. vector score, and document characteristics of each received document. In one embodiment, the received document may be a communication or message. For descriptive purposes the received document, communication, or message are collectively referred to as the received document. The vector is comprised of a collection of characteristic scores within each of the documents. The vector represents a numerical profile of two or more document characteristics. The characteristic scores are indicative of characteristics present within the writing style of a document, e.g. agreeableness, openness, extraversion, etc. Individual personality characteristic scores present in the document are combined to create a vector score indicative of the document writing style. The NL manager (152) may receive a document from the various computing devices (180), (182), (184), (186), (188), and (190) in communication with the network (105). Once the document is received, the NL manager (152) subjects the document to NLP for identification of a vector score and document characteristics. The NL manager (152) further assesses the document characteristics to produce a characteristic score for each document characteristic. In one embodiment, the NL manager assesses the vector to identify the component values that comprise the vector. Accordingly, the NL manager (152) subjects a document to NLP and identifies vector scores, document characteristics, and characteristic scores in the document.

The profile manager (154), which is shown herein operatively coupled to the NL manager (152), functions to produce a characteristic profile for each identified document characteristic. The profile manager (154) leverages the identified characteristic scores associated with the document characteristics for each document and utilizes statistical analysis to produce a characteristic profile for each document characteristic. The characteristic profile is comprised of a range of the characteristic scores across a set of documents. The identified range serves as an expected characteristic score of a future document written by the author. In one embodiment, the document characteristic data is stored in the library (172). As shown, a sample data structure (174) may be employed to organize the stored document characteristic data stored in the library (172). The profile manager (154) leverages the library (172) to store identified characteristic profiles. Accordingly, the profile manager (154) produces a characteristic profile from a set of documents for each document characteristic.

The document manager (156), which is operatively coupled to the NL manager (152) and the profile manager (154), functions to analyze a new or received document. The document manager (156) detects receipt of a new document and analyzes the new document to identify document characteristic data and a corresponding characteristic value. In one embodiment the document manager analyzes the new document to identify the vector score and vector component values. In one embodiment, the document manager (156) leverages the library (172) to store the document characteristic data and corresponding characteristic values of the newly received document. Accordingly, the document manager (156) analyzes a new or received document to identify document characteristic data and a corresponding characteristic value.

The director (158), which is shown operatively coupled to the document manager (156), functions to selectively amend the new document characteristic data and create a new document version from the selective amendment. The director (158) analyzes the identified characteristic data and corresponding characteristic value from the new document with respect to the characteristic profile created by the profile manager (154). In one embodiment, the director analyzes the vector component values of the new document with respect to the vector score from the first set of documents. The director (158) identifies characteristic data, or in one embodiment, tokens, in the new document that are associated with a characteristic value that falls within the characteristic profile. In one embodiment, the director (158) identifies an intersection of one or more vector components of the new document against the document set vector score. Tokens, or characteristic data are words, phrases, and patterns contained in the text of the new document. Words, phrases, and patterns are merely used as examples and should not be considered limiting as other grammatical elements may also be tokens. The director (158) selectively amends the identified characteristic data to change the characteristic value of the new document. In one embodiment, the selective amendment is responsive to the identified intersection of one or more vector components. The director (158) creates a new document version based on the selective amendments. Accordingly, the director (158) selectively amends identified tokens in the text of the document to provide a modified document with a characteristic value that falls outside of the characteristic profile.

The selective amendment undertaken by the director (158) is subject to further review to ensure that the modified document has been sufficiently amended to anonymize the identity of the author. The profile manager (154) subjects the modified document, e.g. new document version, to a characteristic assessment, which includes producing a revised vector score for the modified document. The revised vector score reflects the document amendments, which includes the modified tokens therein. As described above, the director (158) is employed to identify intersection or non-intersection of the document vectors and the vector components. The document manager (156) is responsible for accepting or rejecting the document amendments based on the revised vector score, and more specifically based on the intersection or non-intersection of vector and vector components. For example, in one embodiment, the document manager (156) may accept the document amendments responsive to a non-intersection identification by the director (158), and may reject the document amendments responsive to an intersection identification by the director (158). In response to the director (158) identification of intersection, the director (158) may subject the modified document to further select amendments of one or more tokens. The selective document amendment is concluded when the director (158) has determined or identified non-intersection of the vector components of the modified document with the vector profile of the document set. Accordingly, the director (158) and document manager (156) function to evaluate and continue selective amendment of the modified document using the vector and vector components of the modified document and the document set to support authorship anonymity.

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (170) is configured with library (172) for use by the AI platform (150). In one embodiment, the knowledge base (170) may be configured with other or additional sources of input, and as such, the sources of input shown and described herein should not be considered limiting. Similarly, in one embodiment, the knowledge base (170) includes structured, semi-structured, and/or unstructured content related to activities and tasks. The various computing devices (180)-(190) in communication with the network (105) may include access points for the logically grouped domains and models.

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the A platform (150) also including one or more input interfaces or portals to receive requests and respond accordingly.

The AI platform (150), via a network connection or an internet connection to the network (105), is configured to detect and manage network activity and task data as related to travel and travel scheduling. The AI platform (150) may effectively orchestrate or optimize an orchestrated sequence of actions directed at related activity data by leveraging the knowledge base (170), which in one embodiment may be operatively coupled to the server (110) across the network (105).

The AI platform (150) and the associated tools (152)-(158) leverage the knowledge base (170) and library (172) to enable document modification and authorship anonymity. The profile manager (154) leverages the NL manager (152) to produce a characteristic profile. The document manager (156) leverages the profile manager (154) to identify document characteristic data and values in a new document. The director (158) leverages the document manager (156) to selectively amend new document characteristic data and create a new document version. Accordingly, the tools (152)-(158) identify an author through a personality vector score and modify the document to change the score and provide author anonymity.

Documents and communications, e.g. electronic mail and messages, received across the network (105) may be processed by a server (110), for example IBM Watson® server, and the corresponding AI platform (150). As shown herein, the AI platform (150) together with the embedded tools (152)-(158) provide author anonymity. The function of the tools and corresponding analysis is to modify a document to change the personality vector score associated with the document. Accordingly, the AI platform (150) obscures the identity of an author in an anonymous document.

In some illustrative embodiments, the server (110) may be the IBM Watson® system available from International Business Machines Corporation of Armonk, N.Y., which is augmented with the mechanisms of the illustrative embodiments described hereafter. The tools (152)-(158), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to identify an author through a personality vector score and modify the document to change the score and provide author anonymity.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
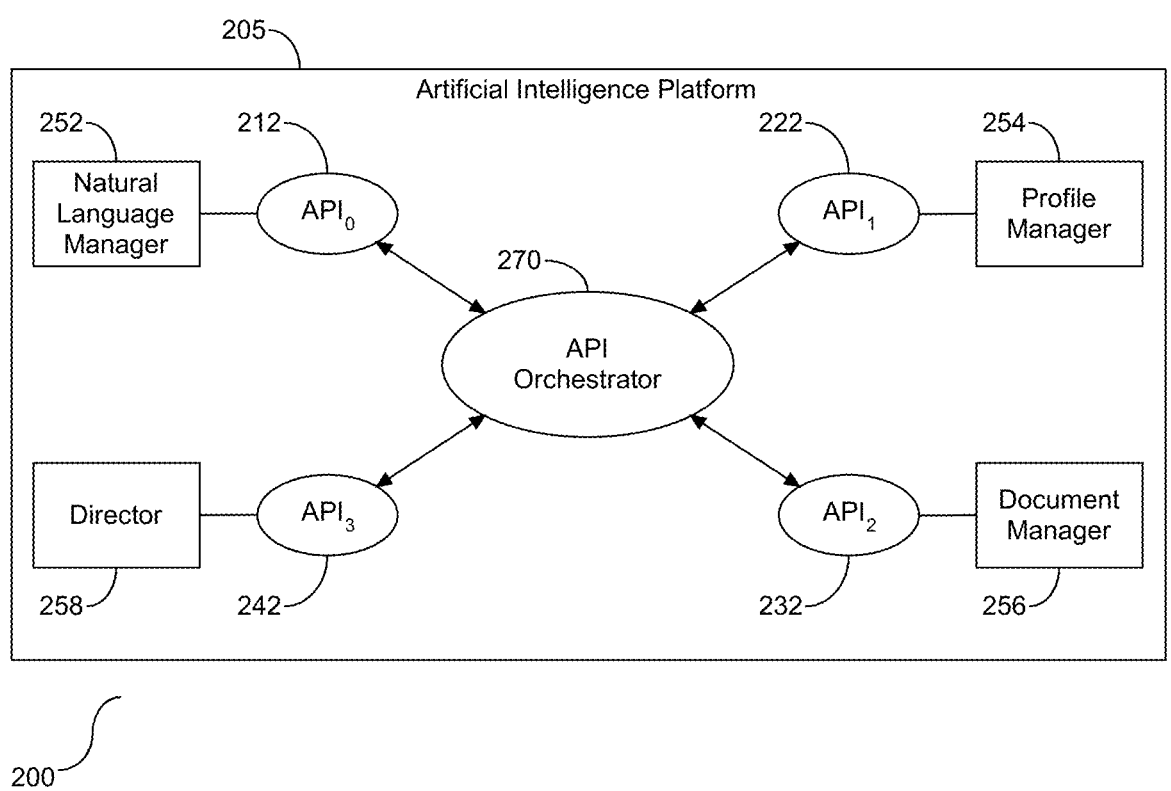
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158), shown herein as tools (252)-(258), and their associated functionality. Referring to FIG. 2, a block diagram (200) is provided illustrating the tools (252)-(258) and their associated APIs. As shown, a plurality of tools is embedded within the AI platform (205), with the tools including the NL manager (152) shown herein as (252) associated with $API_0$ (212), the profile manager (154) shown herein as (254) associated with $API_1$ (222), the document manager (156) shown herein as (256) associated with $API_2$ (232), and the director (158) shown herein as (258) associated with $API_3$ (242).

Each of the APIs may be implemented in one or more languages and interface specifications. $API_0$ (212) provides functional support to identify document characteristics and produce characteristic values; $API_1$ (222) provides functional support to produce a characteristic profile; $API_2$ (232) provides functional support identify document characteristic data and values in a new document, and $API_3$ (242) provides functional support to selectively amend new document characteristic data and create a new document version. As shown, each of the APIs (212), (222), (232), and (242) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
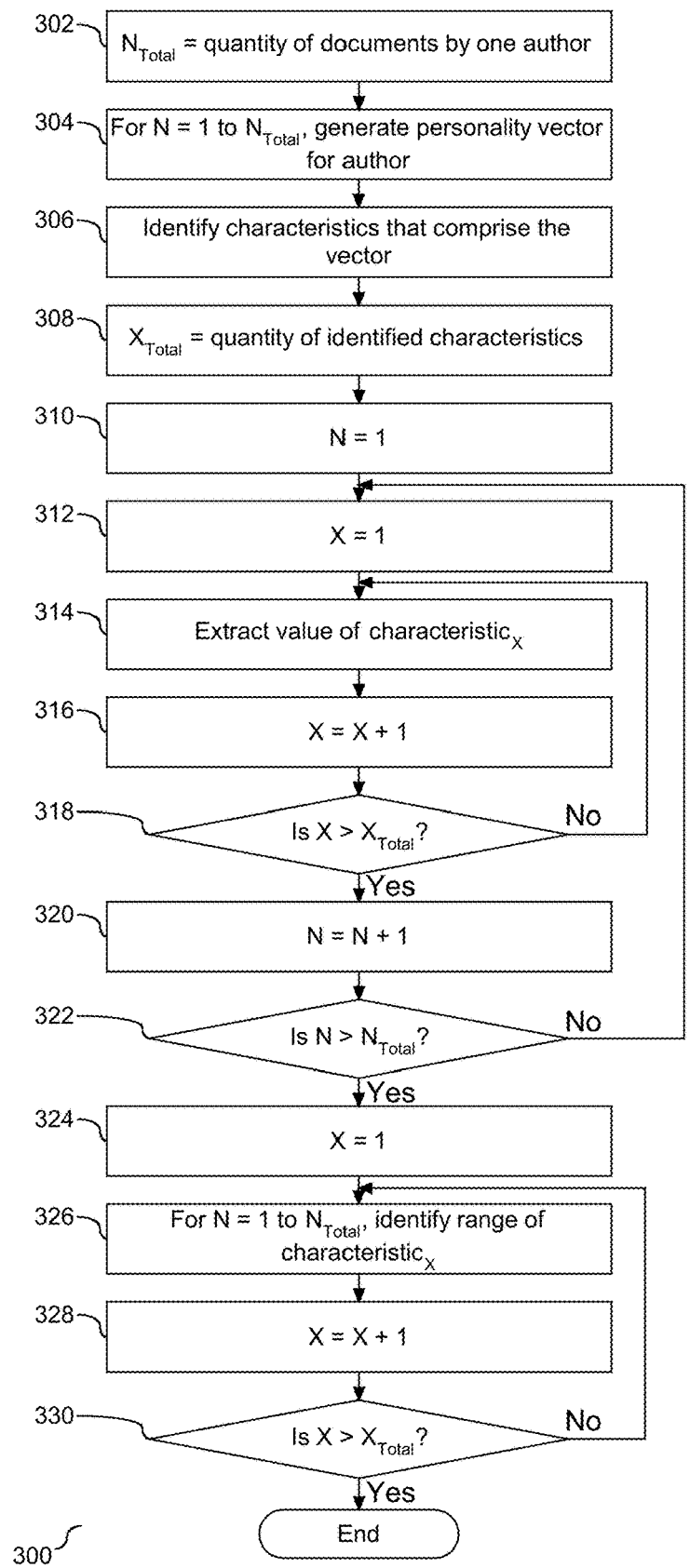
FIG. 3 depicts a flow chart illustrating a process for creating a personality profile based on a historical set of documents written by an author.

Referring to FIG. 3, a flow chart (300) is provided to illustrate a process for creating a personality profile based on a historical set of documents written by an author. As shown, the variable $N_{Total}$ represents a quantity of documents written by a single author (302). Each document in the document set is subjected to natural language processing (NLP) and a vector, referred to herein as a personality vector, is generated for each of the represented documents (304). The personality vector is comprised of a collection of characteristic scores within each of the documents in the document set. In one embodiment, the personality vector pertains to personality and personality characteristics corresponding to the document author and present within the evaluated document. Characteristic scores are indicative of characteristics present within the writing style of a document, e.g. agreeableness, openness, extraversion, etc. The individual personality characteristic scores present in the document are combined to create a vector score indicative of the document writing style. Each of the individual characteristics in the vector score are identified (306) and the variable $X_{Total}$ is assigned to represent a quantity of the identified characteristics (308). Accordingly, as each document is subject to NLP, the personality vector scores and the individual personality characteristic scores within the documents are identified.

Following the creation of the personality vectors and identification of the characteristics that comprise the vectors, the document counting variable, N, and the characteristic counting variable, X, are initialized at steps (310) and (312), respectively. It is understood that the vector is a composite value based on the characteristics represented in the corresponding vector. An identified characteristic may be present one or more times within the document, and may have the same or different values at different occurrences within the document. As shown, the value of characteristic$_X$ is extracted (314) followed by an increment of the characteristic counting variable, X (316). It is then determined if the value of every identified characteristic within vector$_N$ has been extracted (318). A negative response to the determination at step (318) is an indication that there is at least one characteristic value that has not be extracted, as shown herein by a return to step (314). However, a positive response to the determination at step (318) increments the document counting variable, N (320), and it is determined if every document has been subjected to characteristic value extraction (322). A negative response to the determination at step (322) is an indication that there is at least one document that has not been subjected to characteristic value extraction, as shown herein by a return to step (312). However, a positive response to the determination at step (322) indicates that each document in the set has been assessed and the characteristic value extraction process concludes. Accordingly, the characteristic values of one or more documents are extracted to identify personality characteristics of the author within each document.

After the characteristic values have been extracted, the characteristic counting variable is re-initialized (324), and the range of each characteristic$_X$ across all of the documents in the set is identified (326). The identified range serves as an expected characteristic score of a future document written by the author. In one embodiment the standard deviation of each characteristic is calculated across all the documents and is utilized to predict the characteristic scores of a future document from the author. Following step (326), the characteristic counting variable, X, is incremented (328) and it is determined if the range of each characteristic within document$_N$ has been identified (330). A negative response to the determination at step (330) is an indication that there is at least one characteristic range that has not been identified, as shown herein by a return to step (326). However, a positive response to the determination at step (330) indicates that each characteristic range within document$_N$ has been identified and ends the characteristic range identification process across the document set. Accordingly, a characteristic value range is identified across all of the documents within the document set.

Figure 4:
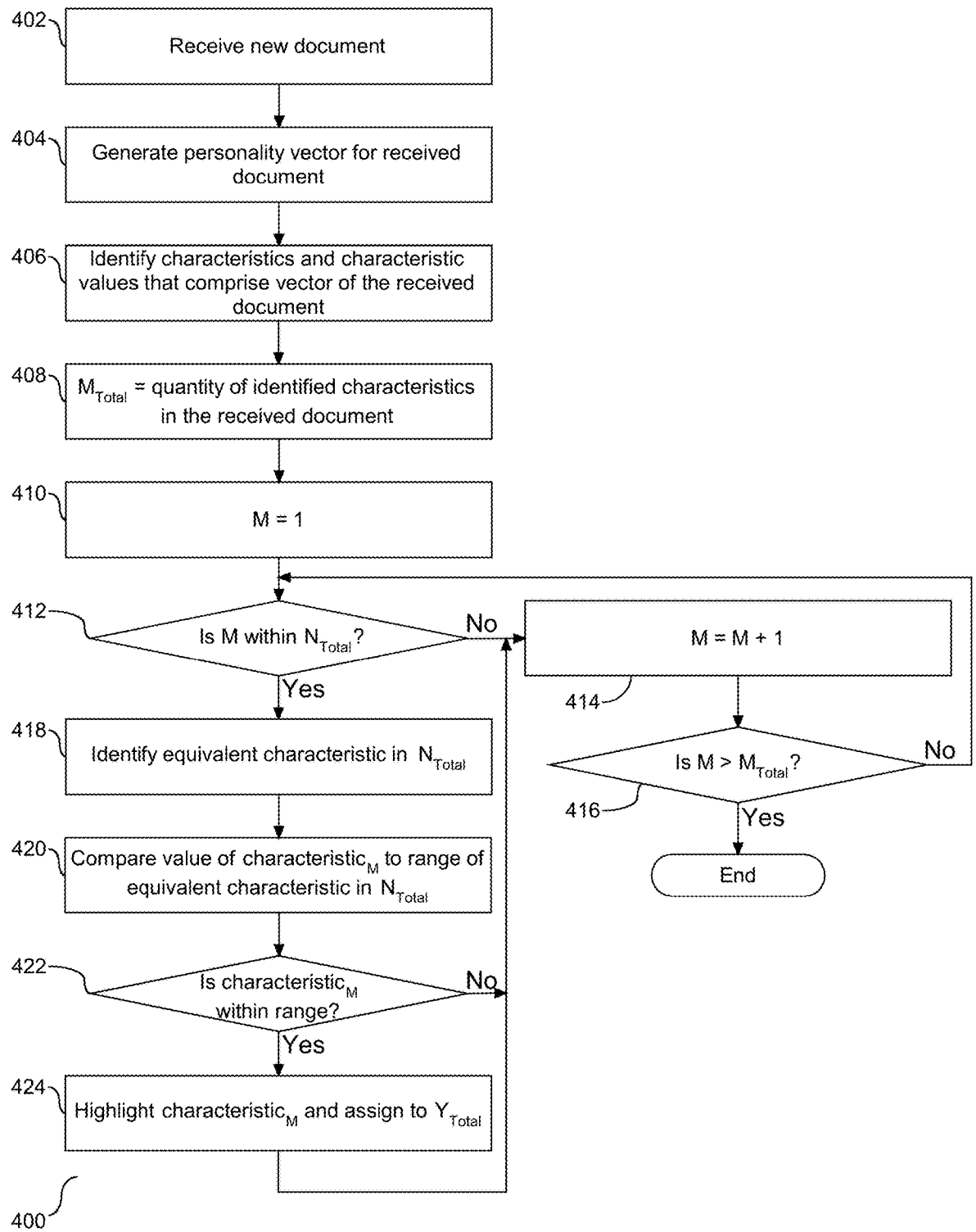
FIG. 4 depicts a flow chart illustrating a process for identifying an author of a new document using the characteristic range.

Referring to FIG. 4, a flow chart (400) is provided to illustrate a process for identifying an author of a new document using the characteristic range identified in FIG. 3. A document is received or otherwise detected (402), and a personality vector score of the received document is generated (404). In one embodiment, the received document may be a writing sample, or a component of a document. The characteristics and characteristic values comprising the vector score of the received document are then identified (406). In one embodiment, the received document may contain a sub-set of characteristics, e.g. not all personality characteristics are necessarily present in each document. The variable $M_{Total}$ is assigned to represent the quantity of identified characteristics in the received document (408), and the variable M representing a characteristic counting variable is initialized (410). It is then determined if characteristic$_M$ is found within a set of known characteristics, $N_{Total}$, as shown and described in FIG. 3 (412). A negative response to the determination to step (412) indicates that characteristic of the received document is not directly present within the set of characteristics $N_{Total}$, and the characteristic counting variable, M, is incremented (414). It is then determined if each characteristic in the received document has been evaluated against the set of characteristics $N_{Total}$ (416). A negative response to the determination at step (416) is followed by a return to step (412), and a positive response to the determination at step (416) indicates that each identified characteristic in the received document has been evaluated and the process concludes. A positive response to the determination at step (412) indicates that characteristic$_M$ is present within the set of characteristics $N_{Total}$ Accordingly, it is determined if the identified characteristics in the received document are present in the characteristics identified in the set of documents.

Following a positive response to the determination at step (412), the characteristic in $N_{Total}$ that is equivalent to characteristic$_M$ is identified (418) and the value of characteristic$_M$ is compared to the identified characteristic value range of the equivalent characteristic in $N_{Total}$ (420). It is then determined if characteristic$_M$ falls within the characteristic value range (422). A positive response to the determination at step (422) indicates that the value of characteristic$_M$ falls within the value range of the equivalent characteristic in $N_{Total}$ and characteristic$_M$ is highlighted or otherwise identified and assigned to the variable $Y_{Total}$ (424). A negative response to the determination at steps (412) or (422), or following step (424) is followed by a return to step (414) to evaluate the next characteristic of the new document. Accordingly, each characteristic in the new document is assessed against a characteristic value range in the set of documents to determine if the new document characteristic is within the predicative range.

Figure 5:
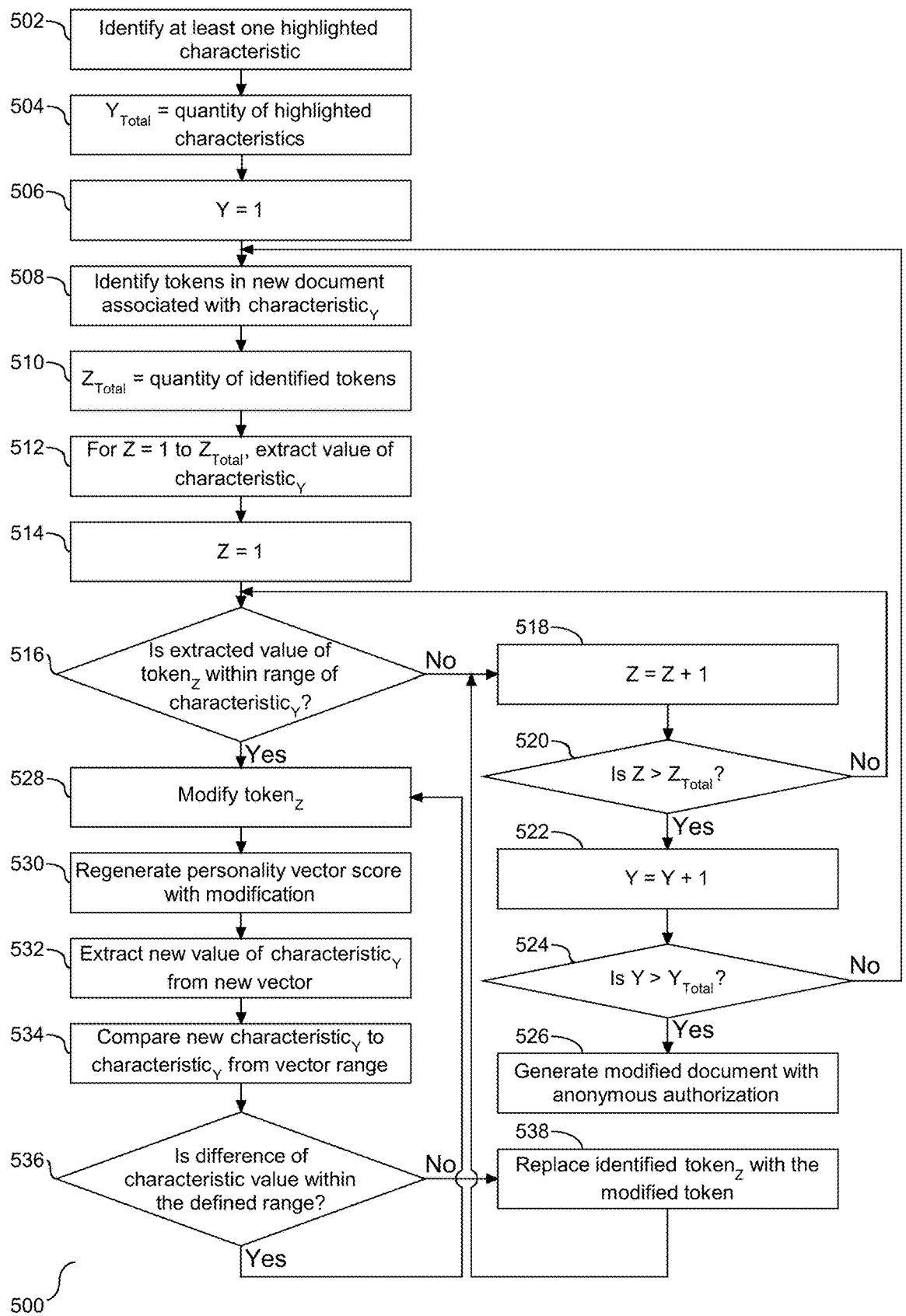
FIG. 5 depicts a flow chart illustrating a process for modifying a document to remove identifiable characteristics.

The process shown in FIG. 3 creates a range of personality characteristic scores that capture elements present within one or more documents or writing samples from an author. The process shown in FIG. 4 analyzes characteristics and characteristic values present in a received document, that are compared to the ranges created in FIG. 3 to identify an anonymous author based on the characteristics present in the author's writing style. To ensure an author's anonymity, the document produced by the author should be modified to remove or deviate from characteristics present in the author's writing style. Referring to FIG. 5, a flow chart (500) is provided to illustrate a process for modifying a document to remove identifiable characteristics, thereby creating or providing anonymity to the document and associated author. At least one highlighted characteristic from the new document that is within the characteristic value range of $N_{Total}$ from FIG. 4 is identified (502). The variable $Y_{Total}$ is assigned to represent the quantity of highlighted characteristics from the new document (504), and a corresponding highlighted characteristic counting variable, Y, is initialized (506). Accordingly, the quantity of highlighted characteristics present in the new document that are within the characteristic value range of the set of documents is determined.

Each identified characteristic$_Y$ is identified and assessed. A score associated with characteristic$_Y$ is produced, or in one embodiment calculated. The score is based on the text contained in the received or identified document or writing sample. The characteristic is assessed based on the text or the sections within the document that determine the characteristic scores, which are comprised of words, also referred to herein as tokens. The usage of the tokens within the document text subject to assessment influences the score. One or more of the tokens can be amended to modify the text that is subject to assessment, with the token amended directed at attaining an altered personality score for characteristic$_Y$. Following step (506), each token within the assessed document that is associated with characteristic$_Y$ is identified (508). The variable $Z_{Total}$ is assigned to represent the quantity of identified tokens within the document (510). For each identified token, the value of the corresponding characteristic$_Y$ is extracted (512), and the token counting variable, Z, is initialized (514). It is then determined if the extracted value of token$_Z$ is within the range of characteristic$_Y$ (516). A negative response to the determination at step (516) indicates that token$_Z$ does not influence the score of characteristic$_Y$ and the token counting variable, Z is incremented (518). A determination is then made if each identified token within the set of identified tokens, e.g. $Z_{Total}$, has been evaluated (520). A negative response to the determination at step (520) is followed by a return to step (516), and a positive response to the determination at step (520) indicates that all of the tokens within the set of identified tokens and associated with characteristic$_Y$ have been evaluated. As shown, the positive response at step (520) is followed by an increment of the highlighted characteristic counting variable, Y, (522), and a determination to assess if each overlapping characteristic has been evaluated (524). A negative response to the determination at step (524) is followed by a return to step (508), and a positive response to the determination at step (524) is following by generating a new document with the modified tokens (526). Accordingly, the identified tokens associated with a characteristic are evaluated to determine if the identified token influence the score of the characteristic.

A positive response to the determination at step (516) indicates that the identified token$_Z$ influences the characteristic score of characteristic$_Y$ and the identified token$_Z$ is modified or subject to modification (528). The modification of the identified token$_Z$ at step (528) consists of replacing the words, phrases, or patterns comprising the token with new words, phrases, or patterns that change the characteristic score associated with the overlapping characteristic. Words, phrases, and patterns are merely used as examples and should not be considered limiting as other grammatical elements may also be replaced to change the characteristic score. Following the modification of the token at step (528), the personality vector score is regenerated using the modified token (530), and the new value of characteristic$_Y$ is extracted from the re-generated personality vector score (532). The new value of characteristic$_Y$ is compared to the character value range of characteristic$_Y$ established from the set of documents, $N_{Total}$ (534). It is then determined if the new value of characteristic$_Y$ is within the range of values for characteristic$_Y$ (536). A positive response to the determination at step (536) indicates that the modified token does not change or sufficiently modify the characteristic score and the token requires further modification, as demonstrated by a return to step (528). However, a negative response to the determination at step (536) is followed by replacement of token$_Z$ with the modified token (538). The process then returns to step (518) to evaluate the next identified token. Accordingly, identified tokens associated with the characteristic score are replaced with modified tokens to change the characteristic score of the document, thereby creating a modified document that does not stylistically identify the document author.

Figure 6A:
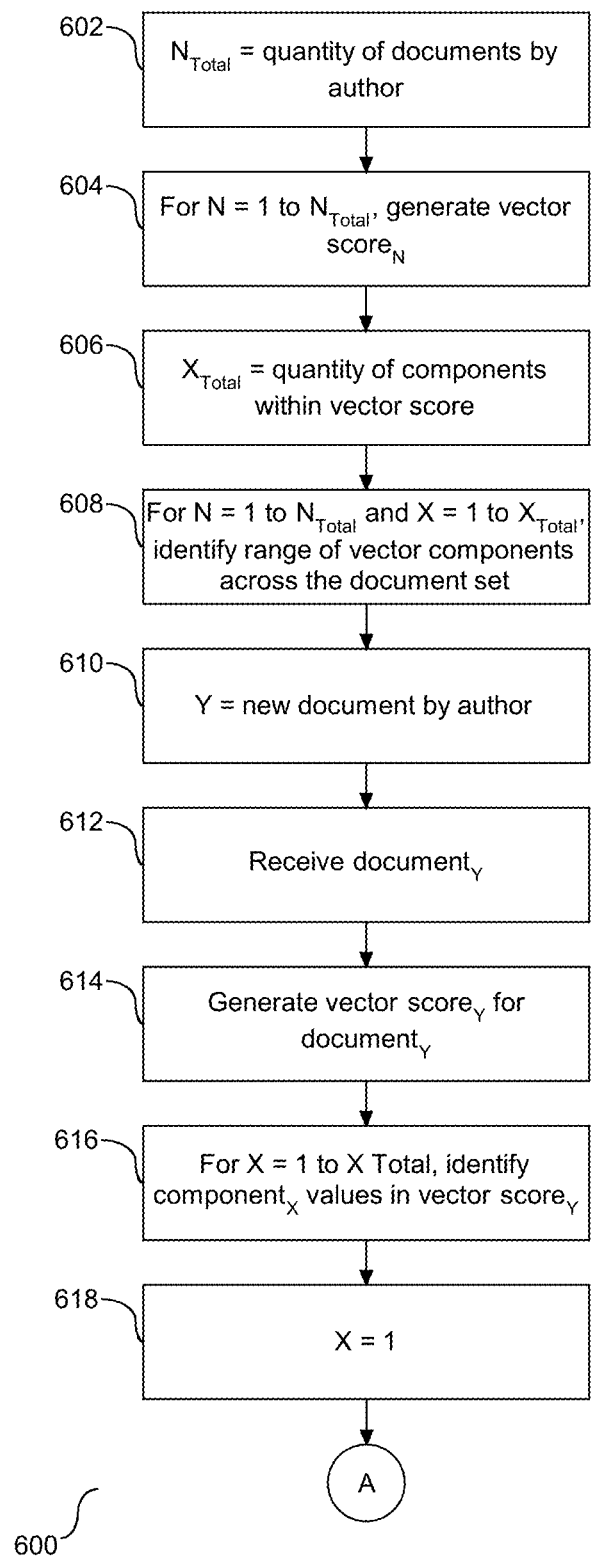
FIGS. 6A and 6B depict a flow chart illustrating a process for modifying a document to change the vector score.
Figure 6B:
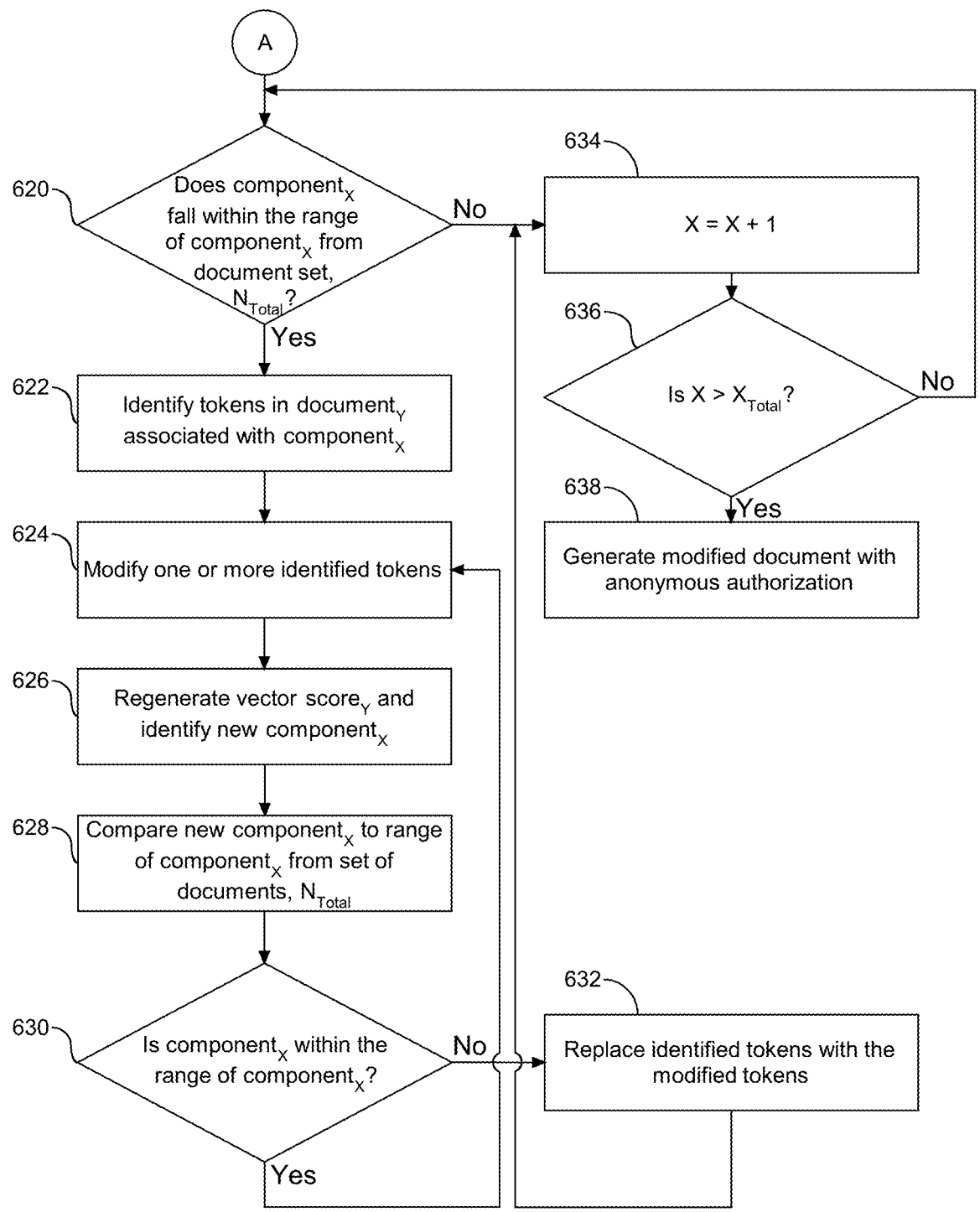

The process shown in FIGS. 3-5 involves identifying characteristics within the personality vector and modifying those characteristics to remove the identity of an author from a document. In one embodiment this process can be performed without identifying the characteristics. Referring to FIGS. 6A and 6B, a flow chart (600) is provided to illustrate a process for modifying a document to change the vector score, thereby creating or providing anonymity to the document and associated author. Similar to FIG. 3, the variable $N_{Total}$ represents a quantity of documents written by a single author (602). Each document in the document set is subjected to natural language processing (NLP) and a vector score is generated for each of the represented documents (604). The vector score is comprised of a collection of vector components within each of the documents in the document set. The variable $X_{Total}$ is assigned to represent a quantity of components within the vector score (606). For each document in the set and each identified vector component, a range is identified for each vector component score across the document set (608). Accordingly, as each document is subject to NLP, the vector scores and the vector component scores within the documents are identified and a range of the vector component scores are identified.

Following step (608), the variable Y is assigned to represent a new document from the author (610) and document$_Y$ is received (612). The vector score for document$_Y$, score$_Y$, is generated (614) and for each component in score$_Y$, the component score, component, is identified (616). The component counting variable, X, is initialized (618) and it is determined if component$_X$ falls within the associated component range identified in the document set $N_{Total}$ (620). A positive response to the determination at step (620) indicates that component$_X$ indicates the identity of the author and one or more tokens in document$_Y$ that are associated with component$_X$ overlap or intersect (622). The one or more identified tokens are modified (624), wherein the modification consists of replacing the words, phrases, or patterns comprising the token with new words, phrases, or patterns that change the component score of component$_X$. Words, phrases, and patterns are merely used as examples and should not be considered limiting as other grammatical elements may also be replaced to change the component score. Following the modification of one or more tokens at step (624), the vector score$_Y$ is regenerated using the modified token(s) and the new value of component$_X$ is extracted from the re-generated vector score (626). The new value of component$_X$ is compared to the character value range of component$_X$ established from the vector score(s) associated with the set of documents, $N_{Total}$ (628). It is then determined if the new value of component$_X$ is within the range of values for component$_X$ (630). A positive response to the determination at step (630) indicates that the modified one or more tokens do not change or sufficiently modify the component score and the one or more tokens require further modification, as demonstrated by a return to step (624). However, a negative response to the determination at step (630) is followed by replacement of the identified one or more tokens with the modified token(s) (632). Accordingly, identified tokens are selectively replaced, or in one embodiment individually replaced, with modified tokens to change the component score of the document.

Following either step (632) or a negative response to the determination at step (620), the component counting variable, X, is incremented (634) and a determination is made if all of the components in the vector score have been evaluated (636). A negative response to the determination at step (636) indicates that not every vector component has been evaluated and the process returns to step (620). A positive response to the determination at step (636) indicates that every vector component of the vector score has been evaluated and the document containing the modified token(s) is generated (638). Accordingly, a modified document is generated with the modified token(s) that does not stylistically identify the document author.

Figure 7:
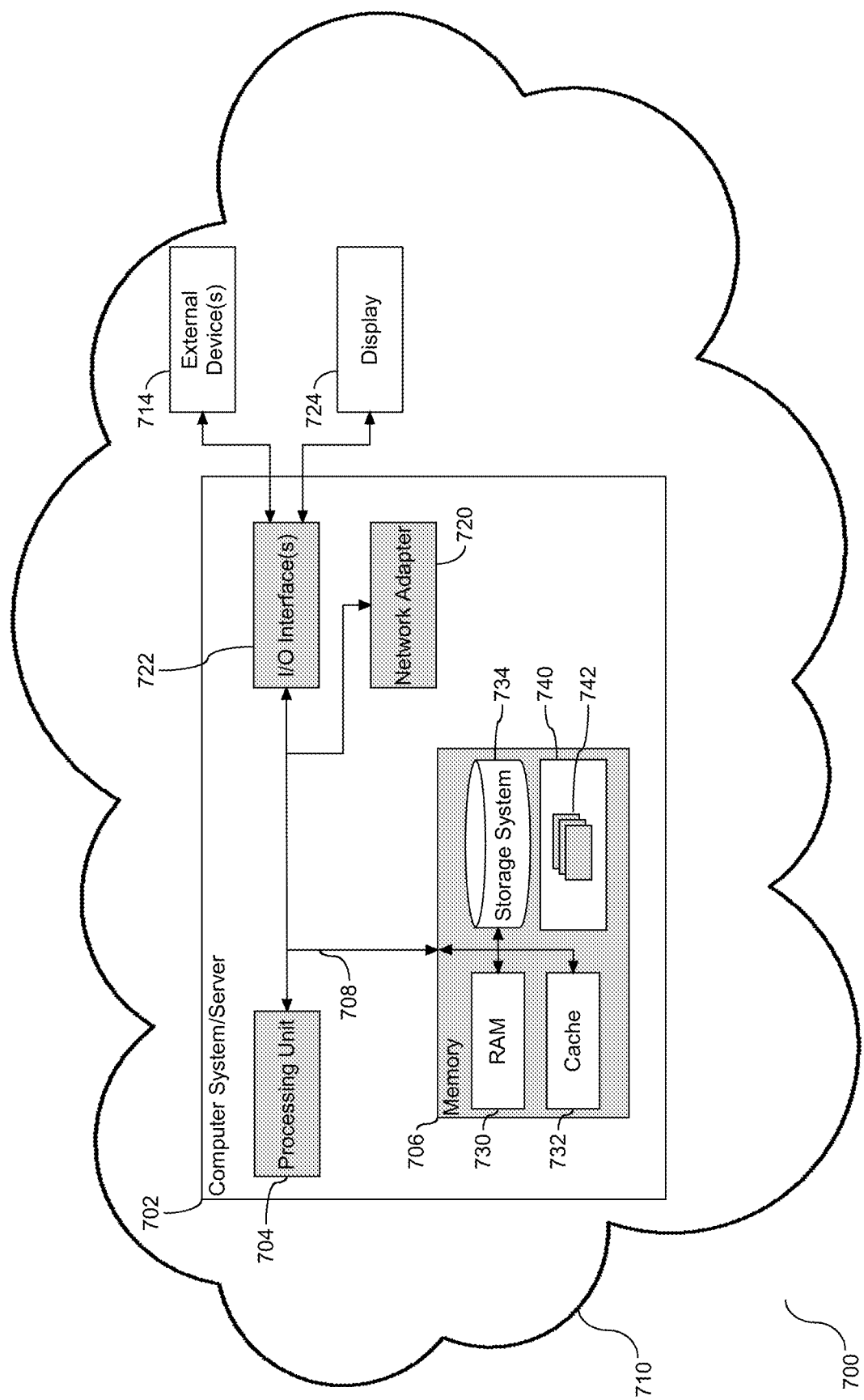
FIG. 7 depicts a block diagram illustrating an example of a computer system/server of a cloud based support system, to implement the system and processes described above with respect to FIGS. 1-6B.

Embodiments shown and described herein may be in the form of a computer system for use with an intelligent computer platform for identifying an author through a personality vector score and modifying the document to change the score and provide author anonymity. The embodiments and their associated functionality may be embodied in a computer system/server in a single location, or in one embodiment, may be configured in a cloud based system sharing computing resources. With reference to FIG. 7, a block diagram (700) is provided illustrating an example of a computer system/server (702), hereinafter referred to as a host (702) in a cloud computing environment (710), to implement the system, tools, and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to detect the accuracy of annotation patterns and dynamically apply a weight score to construct ground truth data. For example, the set of program modules (742) may include the tools (152)-(158) as described in FIG. 1.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
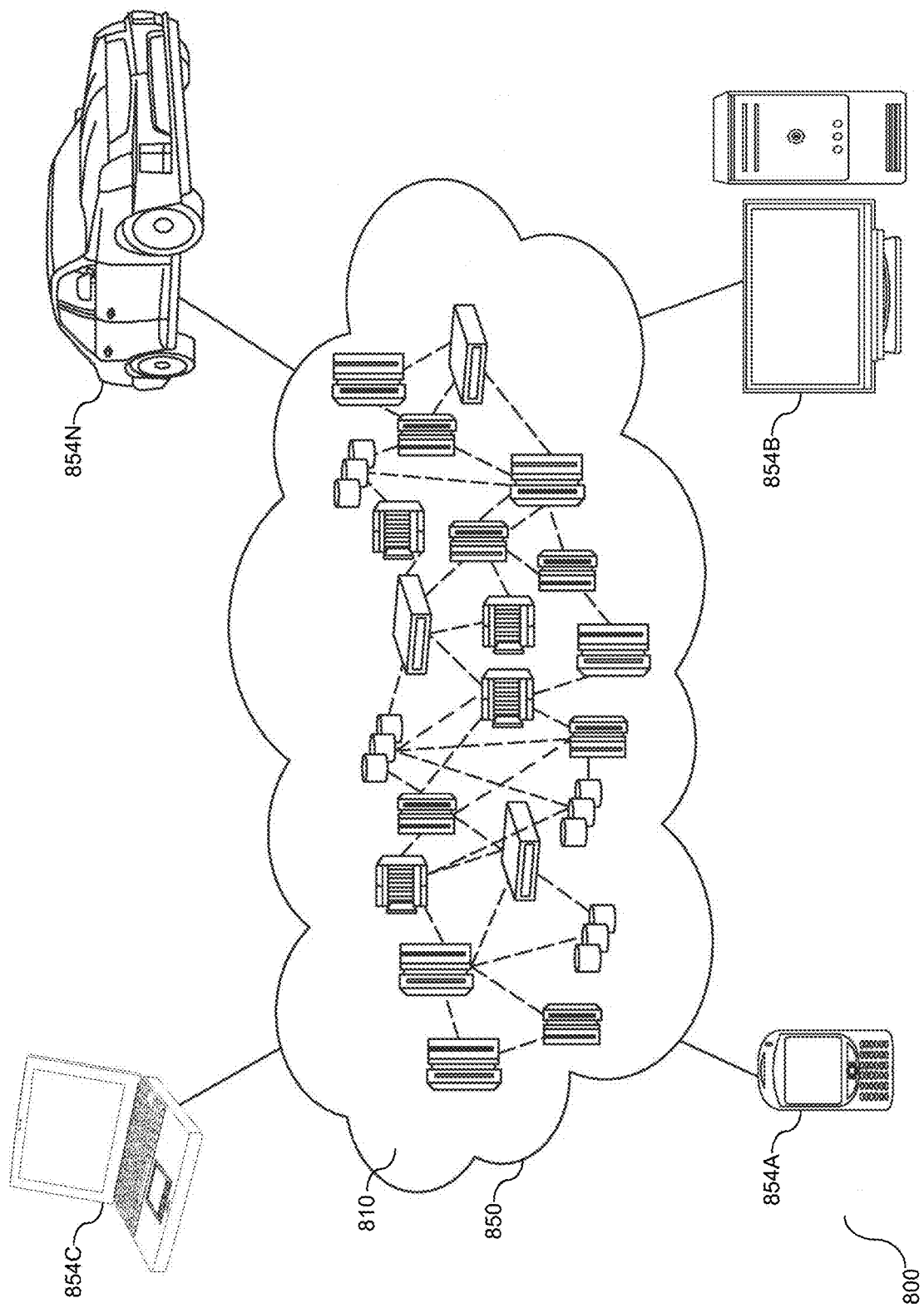
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
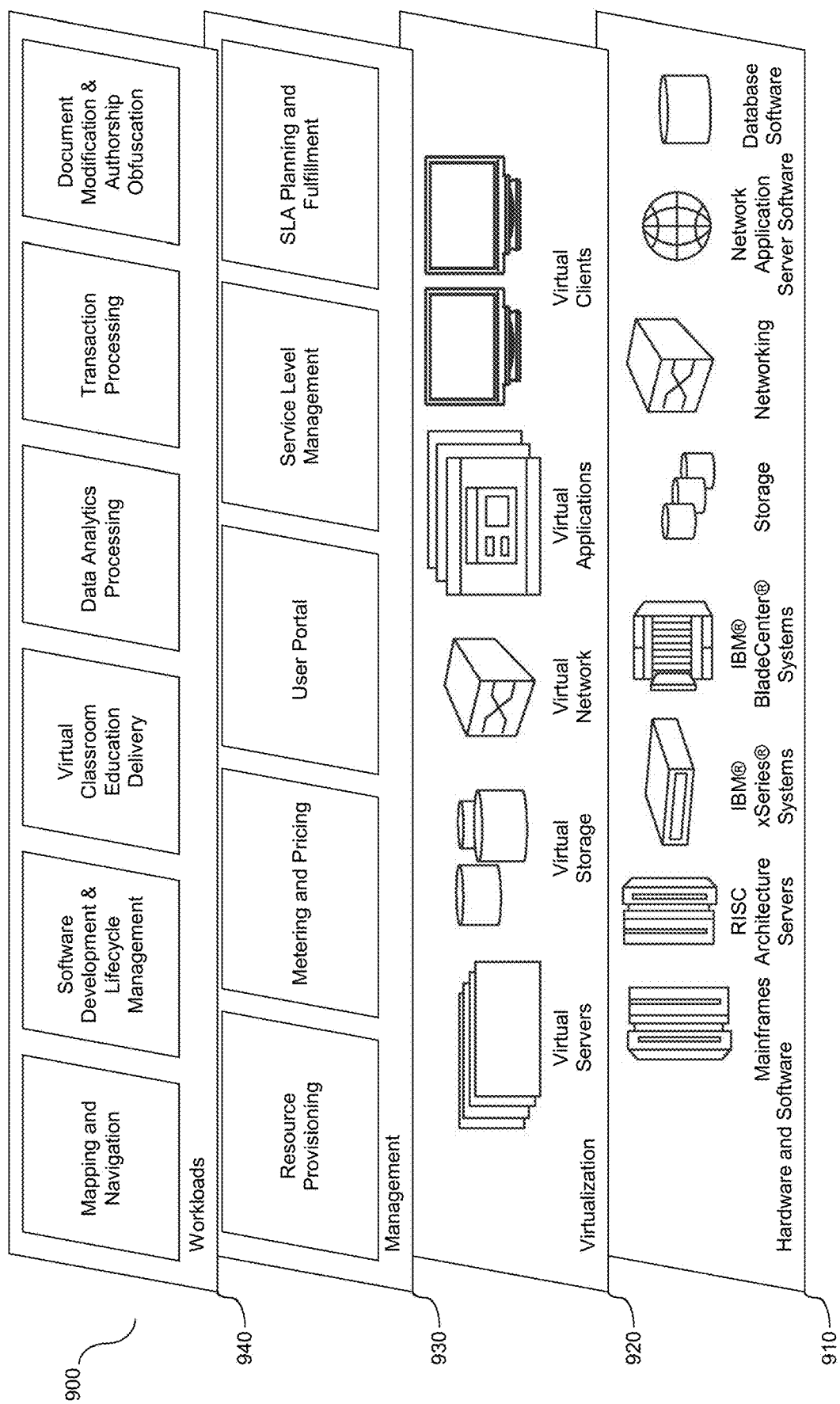
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and document modification and authorship obfuscation.

It will be appreciated that there is disclosed herein a system, method, apparatus, and computer program product for identifying an author through a personality vector score and modifying the document to change the score and provide author anonymity.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, method, and/or a computer program product are operative to improve the functionality and operation of an artificial intelligence platform to document modification for author obfuscation.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processing unit operatively coupled to memory; and
an artificial intelligence (AI) platform in communication with the processing unit, the AI platform including one or more tools to identify and amend one or more document characteristic values, including:
  a natural language (NL) manager configured to subject a document set comprising two or more documents authored by a common author to natural language processing (NLP), including identify two or more document characteristics within the two or more documents of the document set, and subject the identified two or more document characteristics to an assessment, the assessment to produce a corresponding characteristic value for each of the identified two or more document characteristics in each of the two or more documents authored by the common author;
  a profile manager, operatively coupled to the NL manager, the profile manager configured to statistically analyze the identified two or more document characteristics and the corresponding characteristic values across the two or more documents authored by the common author, the statistical analysis to produce a characteristic profile for each identified document characteristic;
  a document manager, operatively coupled to the profile manager, the document manager configured to detect receipt of a new document authored by the common author, and statistically analyze the new document with respect to the identified two or more document characteristics, including identify document characteristic data and a corresponding characteristic value;
  a director, operatively coupled to the document manager, the director configured to:
    selectively identify an intersection or a non-intersection of one or more vector component values of the new document and one or more vector scores from the document set;
    responsive to the intersection, selectively amend one or more tokens of text of the new document to change the characteristic value of the new document to fall outside of the characteristic profile; and
    create a new document version from the selective amendment.

2. The computer system of claim 1, wherein the selective amendment of one or more tokens of text of the new document to change the characteristic value comprises the director configured to modify the one or more tokens, the modification comprising replacement of the one or more tokens with one or more new tokens.

3. The computer system of claim 2, wherein the profile manager is further configured to subject the new document version to a characteristic assessment, including produce a new characteristic value for each modified token.

4. The computer system of claim 3, wherein the document manager is further configured to accept the new document amendment responsive to identification of divergence of the new document characteristic assessment from the characteristic values across the two or more documents authored by the common author.

5. The computer system of claim 1, wherein the director configured to selectively amend tokens of text of the new document provides authorship anonymity with respect to the new document version.

6. The computer system of claim 1, wherein the characteristic value for each document characteristic in each of the documents is a composite value.

7. The computer system of claim 1, wherein the director is further configured to, responsive to the non-intersection, not selectively amend the new document.

8. A computer program product to identify and amend one or more document characteristic values, the computer program product comprising:
a computer readable storage medium having program code embodied therewith, the program code executable by a processor to:
subject a document set comprising two or more documents authored by a common author to natural language processing (NLP), including identify two or more document characteristics within the two or more documents of the document set, and subject the identified two or more document characteristics to an assessment, the assessment producing a corresponding characteristic value for each of the identified two or more document characteristics in each of the two or more documents authored by the common author;
statistically analyze the identified two or more document characteristics and the corresponding characteristic values across the two or more documents authored by the common author, the statistical analysis producing a characteristic profile for each identified document characteristic;
responsive to receiving a new document authored by the common author, statistically analyze the new document with respect to the identified two or more document characteristics, including identify document characteristic data and a corresponding characteristic value;
selectively identify an intersection or a non-intersection of one or more vector component values of the new document and one or more vector scores from the document set;
responsive to the intersection, selectively amend one or more tokens of text of the new document to change the characteristic value of the new document to fall outside of the characteristic profile; and
create a new document version from the selective amendment.

9. The computer program product of claim 8, wherein the selective amendment of one or more tokens of text of the new document to change the characteristic value comprises program code executable by the processor to modify the one or more tokens, the modification comprising replacement of the one or more tokens with one or more new tokens.

10. The computer program product of claim 9, further comprising program code executable by the processor to subject the new document version to a characteristic assessment, including produce a new characteristic value for each modified token.

11. The computer program product of claim 10, further comprising program code executable by the processor to accept the new document amendments responsive to identifying divergence of the new document characteristic assessment from the characteristic value of the document set.

12. The computer program product of claim 8, wherein the characteristic value for each document characteristic in each of the documents is a composite value.

13. The computer program product of claim 8, further comprising program code executable by the processor to, responsive to the non-intersection, not selectively amend the new document.

14. A method comprising:
using a computer processor to support an artificial intelligence (AI) platform to identify and amend one or more tokens, including:
subjecting a document set comprising two or more documents authored by a common author to natural language processing (NLP), including identifying two or more document characteristics within the two or more documents of the document set, and subjecting the identified two or more document characteristics to an assessment, the assessment producing a corresponding characteristic value for each of the identified two or more document characteristics in each of the two or more documents authored by the common author;
statistically analyzing the identified two or more document characteristics and the corresponding characteristic values across the two or more documents authored by the common author, the statistical analysis producing a characteristic profile for each identified document characteristic;
responsive to receiving a new document authored by the common author, statistically analyzing the new document with respect to the identified two or more document characteristics, including identifying document characteristic data and a corresponding characteristic value;
selectively identifying an intersection or a non-intersection of one or more vector component values of the new document and one or more vector scores from the document set;
responsive to the intersection, selectively amending one or more tokens of text of the new document to change the characteristic value of the new document to fall outside of the characteristic profile; and
creating a new document version from the selective amendment.

15. The method of claim 14, wherein the selective amendment of tokens of text of the new document to change the characteristic value comprises modifying the one or more tokens, the modifying comprising replacing the one or more tokens with one or more new tokens.

16. The method of claim 15, further comprising, using the computer processor, subjecting the new document version to a characteristic assessment, including producing a new characteristic value for each modified token.

17. The method of claim 16, further comprising, using the computer processor, accepting the new document amendments responsive to identifying divergence of the new document characteristic assessment from the characteristic value of the document set.

18. The method of claim 14, wherein the selectively amending tokens of text of the new document provides authorship anonymity with respect to the new document version.

19. The method of claim 14, wherein the characteristic value for each document characteristic in each of the documents is a composite value.

20. The method of claim 14, further comprising not selectively amending the new document responsive to the non-intersection.

\* \* \* \* \*